INVENTOR
R. A. KAENEL
BY Herbert M. Shapiro
ATTORNEY

United States Patent Office 3,447,142
Patented May 27, 1969

3,447,142
ASYCHRONOUS MAGNETIC SHIFT REGISTER CIRCUIT

Reginald A. Kaenel, Chatham, N.J., assignor to Bell Telephone Laboratories, Incorporated, New York, N.Y., a corporation of New York Filed Nov. 30, 1965, Ser. No. 510,587
Int. Cl. G11b *5/44, 13/00*
U.S. Cl. 340—174 14 Claims

ABSTRACT OF THE DISCLOSURE

Asynchronous operation of a shift register is achieved in the absence of a buffer store by shifting information back and forth in the register at a rate faster than the input or output rates. By moving stored information back and forth in this manner, that information is properly positioned for both write-in and readout essentially simultaneously. Inputs, responsive to coded input signals, are enabled by the arrival of information at the input. Readouts, responsive to read signals, are enabled by the arrival of information at the output.

This invention relates to magnetic circuits and, more particularly, to such circuits which convert information from one form to another.

Information converters are used, for example, to convert multifrequency input information to dial pulses thus making pushbutton type telephones compatible with existing central offices. The function of such a converter, in this context, is to convert a two-out-of-seven pulse code to a corresponding number of dial pulses. Existing additional equipment provides the two-out-of-seven pulses in response to multifrequency input.

Frequently, in practice, coded input information is converted to positional information in a register and pulses are generated in the output of that register as the information is advanced therethrough. Always, the information is written in the register at a rate different from that at which it is read out. This is due to the fact that central office switching equipment accepts dial pulses at a first rate whereas the register receives pulses at a second rate, higher than the first rate, determined by the subscriber. A buffer store permits independent write and read-out rates as is described, for example, in L. A. Hohmann, Patent No. 2,933,563, issued Apr. 19, 1960. Buffer stores, however, are expensive pieces of equipment comprising typically a word-organized magnetic memory with read and write registers.

An object of this invention is a new and novel converter with independent write and read-out rates.

The foregoing and further objects of this invention are realized in one embodiment thereof wherein a magnetic domain wall device is turned to account. Domain wall devices conveniently comprise a magnetic medium, typically a wire, of a material characterized by the ability to maintain a reverse (magnetized) domain therein in response to a first magnetic field in excess of a nucleation threshold and the ability to move that domain therealong in response to a second field in excess of a propagation threshold but less than the nucleation threshold. The device, in accordance with the present invention, includes first and second magnetic wires each having input and output portions defining a reference position therebetween. A first reverse domain is nucleated in the input portion of the first wire at a position spaced apart from the reference position a number of positions different for each of a number of coded inputs. Thus coded input information is converted to positional information. A polyphase propagation pulse sequence is applied to generate fields in both wires to advance any reverse domains present in the wires to remote output positions for selectively producing an output pulse there. Each set of propagation pulses advances the reverse domains one position and enables the nucleation of a second reverse domain in the output portion of the second wire next adjacent the reference position. The arrival of the first reverse domain at that reference position inhibits further nucleation of second reverse domains in the second wire. Thus a decimal digit is represented by a number of second reverse domains in succeeding positions in the output portion of the second wire followed by a first reverse domain in the next succeeding position of the first wire. In response to the arrival of a reverse domain at the output position, the polyphase pulse sequence is reversed. Thus, the reverse domains are moved back toward the reference position until the reverse domain most recently stored in the output portion of the first wire is returned to that position enabling additional input. In this manner, reverse domains are quickly circulated between input and output positions so that, for all practical purposes, stored information is, simultaneously, in a position for either wiring into a next available position or, for reading out an earliest stored "bit." Whether or not writing or read out actually occurs when so permitted depends upon the subscriber in the first instance and the handling rate of the dial pulse utilization circuit in the second.

Accordingly, a feature of this invention is a domain wall device wherein reverse domains are circulated between input and output positions in a magnetic wire permitting the writing of a sequence of reverse domains at the former position and permitting the read out of an earliest stored reverse domain at the latter at rates independent of one another.

Another feature in accordance with this invention is a first magnetic wire in which a reverse domain is stored in response to a coded input, and propagated to a reference position for controlling the number of reverse domains stored in a second wire.

The invention and the various objects and features thereof will be understood more fully from a consideration of the following detailed description rendered in conjunction with the accompanying drawing, wherein.

Figure 1:
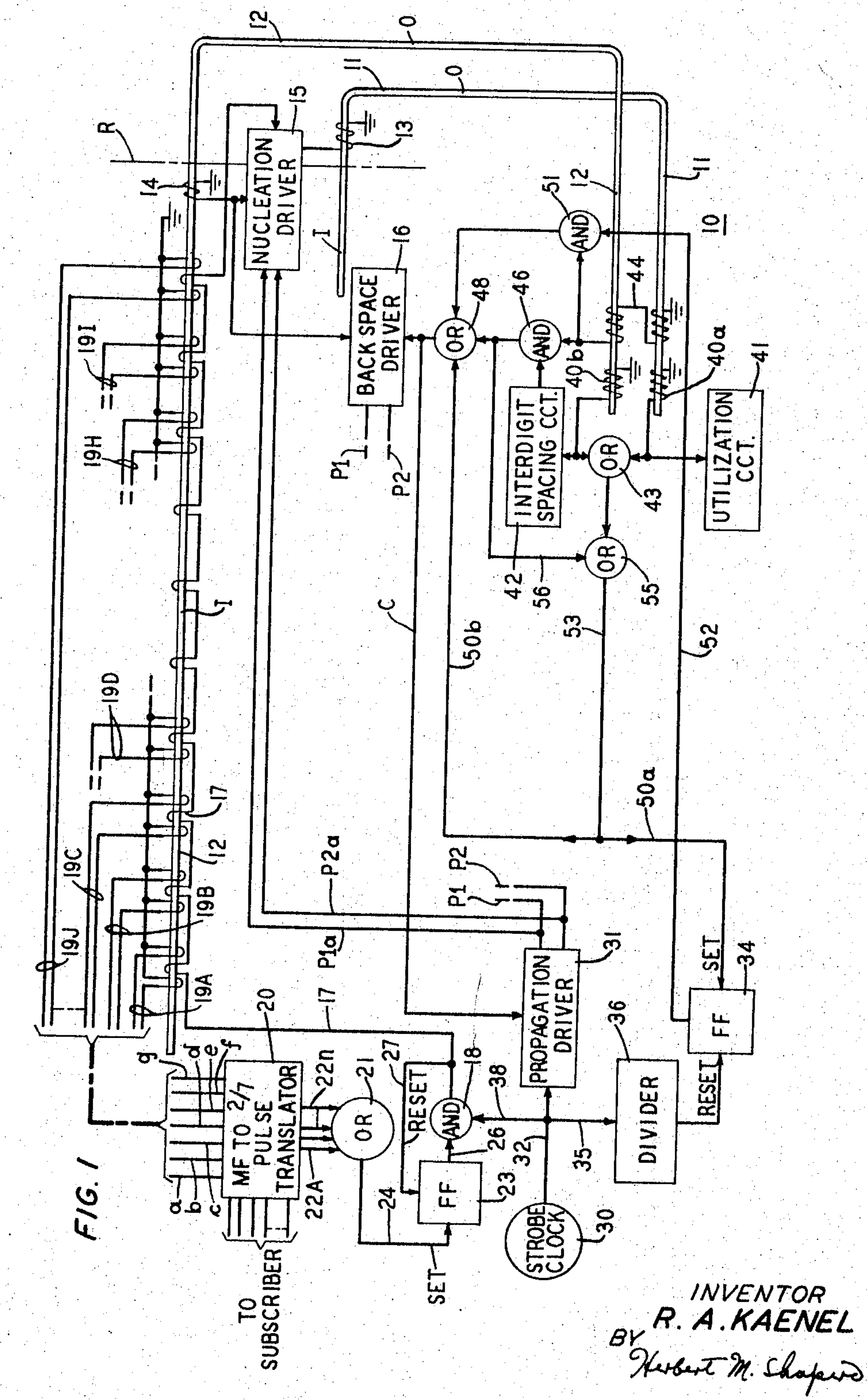
FIG. 1 is a schematic illustration of a converter in accordance with this invention.

Specifically, FIG. 1 depicts a coded input-to-dial pulse converter 10 in accordance with this invention. The converter comprises a first and second magnetic wires 11 and 12 having the properties described hereinbefore. Wires 11 and 12 are coupled by conductors, designated 13 and 14, respectively, to opposite sides of a corresponding reference position represented by a vertical broken line designated R. It is convenient to think of the reference position as representing the mean position for conductors 13 and 14. As will become clear hereinafter, conductors 13 and 14 comprise an input control for wire 12 and as such constitute an input "position". The reference line, thus, generally designates an input position and divides the wires 11 and 12 into input and output portions, those portions are designated I and O, respectively, for each wire. It is also convenient to think of the associated circuitry similarly divided into the input and output circuitry.

*Input circuitry*

Conductor 13, then, is connected between a nucleation driver 15 and ground. In response to each activation of nucleation driver 15 as described hereafter, conductor 13 establishes a stable reverse domain in the coupled portion of wire 11. Conductor 14 is connected between nucleation driver 15 and a backspace driver 16 at one end and ground at the other serving to deactivate those drivers when pulsed as described hereafter. A conductor 17 is coupled to the input portion I of wire 12 over limited lengths at various positions therealong as is explained hereinafter. The conductor 17 is connected between an output of an AND circuit 18 and nucleation driver 15 serving to activate the latter when pulsed. A plurality of coded conductor pairs 19A . . . 19J are coupled to both sides of corresponding positions coupled by conductor 17. Each conductor of conductor pairs 19A . . . 19J is connected between a multifrequency to two-out-of-seven pulse translator 20, including outputs designated *a* through *g*, and ground. Such translators, the connection thereof to subscriber (telephone) subsets, and the coded outputs therefrom are well understood in the art and are only indicated in diagrammatic form. Suffice it to say that a coded two-out-of-seven output of translator 20 is activated and that the activated two outputs correspond to one of the conductor pairs. Thus, for example, the activation of outputs *b* and *e* from translator 20 may correspond to the decimal digit 7 and will apply a pulse to conductor pair 19D.

Translator 20 is connected further to inputs of an OR circuit 21 by means of conductors **22A . . . 22*n*. In turn, the output of OR circuit 21 is connected to a flip-flop 23 via a conductor 24. Flip-flop 23 is connected via a conductor 26 to an input of AND circuit 18. A reset conductor 27 is connected between conductor 17 and flip-flop 23** for resetting the latter when the former becomes active as will become clear hereinafter.

A strobe clock 30 is connected to propagation driver 31 my means of a conductor 32. Strobe clock 30 also is connected to a flip-flop 34 by means of a conductor 35 and a frequency divider 36 and is connected directly to an input of AND circuit via a conductor 38. A pair of propagation conductors P1 and P2 (merely indicated for simplicity) are connected to backspace driver 16 and propagation driver 31 at one end and ground at the other. The conductors P1 and P2 are connected to nucleation driver 15 via conductors **P1*a* and P2*a* for control of driver 15** as discussed hereinafter.

The input circuitry operates, importantly, to move information, stored as sequence of second reverse domains in wire 11 spaced by a first reverse domain in wire 12 between an input position at which additional information may be stored properly in sequence and an output position at which information may be read out properly in sequence. The former position is that portion of wires 11 and 12 coupled by conductors 13 and 14. The latter position is that portion of wire 11 and wire 12 coupled by conductors **40*a*, 40*b* and 44**.

Stored information is moved rapidly between these two positions by propagation driver 31 and backspace driver 16, each of which, operating at different times, pulses (typically at a 400 kilocycle rate) propagation conductors P1 and P2 in a polyphase fashion well known in the art. (See K. D. Broadbent, Patent No. 2,919,432, issued Dec. 29, 1959.) Conductors P1 and P2 conveniently comprise coils coupling wires 11 and 12 to provide oppositely poled propagation fields in spaced apart positions therealong, when pulsed, for propagating stored reverse domains. Drivers 16 and 31 may comprise a single driver which functions to change the direction of propagation of reverse domains conveniently by reversal of the polarities of propagation pulses applied to conductors P1 and P2.

The change in propagation direction is controlled, for example, at the input end of the circuit, via conductor 14 in response to a pulse induced therein for deactivating backspace driver 16 when a first reverse domain returns from the output position and passes that portion of wire 12 coupled thereby. Strobe clock 30 functions to activate propagation driver 31 which, in response, advances stored reverse domains to the output position. The activation of driver 31 is accomplished, more specifically, by a strobe pulse which is applied to conductor 32 at a frequency *f*. Those reverse domains are returned to an input position prior to a next succeeding strobe pulse normally without producing an output in a manner more properly discussed in connection with the output circuitry hereinafter.

It is clear then that each time a strobe pulse is applied, propagation driver 31 provides (propagation) fields for advancing the stored domains to an output position. It is also clear that the stored domains are returned to the reference position before a next succeeding strobe pulse is applied.

Input information from translator 20 controls the number of (second) reverse domains stored in wire 11. This is important because each domain stored in wire 11 produces a dial pulse via coductor **40*a* and utilization circuit 41 when such a pulse is permitted as discussed hereinafter. Specifically, translator 20**, in response to a multifrequency code initiated by a subscriber subset (not shown), pulses a corresponding two-out-of-seven of its outputs, *a* through *g*, and a corresponding conductor, 22A through **22*n*, which is connected to an input of OR circuit 21. In response to the translator output, a corresponding conductor pair, 19A through 19J, is pulsed, and (via OR circuit 21) flip-flop 23 is set. Flip-flop 23 provides an output for enabling AND circuit 28. A strobe pulse activates the so-called AND circuit 18 for pulsing conductor 17 and resetting, via conductor 27, flip-flop 23. A pulse on conductor 17 nucleates an unstable reverse domain in each portion of wire 12 coupled thereby. The pulse on a reverse conductor pair, 19A through 19J, expands the unstable reverse domain to a stable length only at the corresponding (selected) position along wire 12. Thus a stable first reverse domain is stored in a selected position along wire 12** when a strobe pulse and an input pulse occur concurrently.

Strobe pulses, however, occur at a frequency (typically 0.5 kilocycle) far in excess of any realizable dialing rate (typically 10 cycles per second). Thus, frequently, strobe pulses are applied in the absence of a concurrent input from translator 20. Whether an input is present or not, however, a strobe pulse activates propagation driver 31 for advancing stored reverse domains to the output position. When an input and a strobe pulse occur concurrently, nucleation driver 15 is activated also via conductor 17. A first stable reverse domain also is stored in wire 12 a selected number of positions from the portion of wire 12 coupled by conductor 14 as has already been described. Propagation driver 31, now activated, advances all stored domains, including that first domain in wire 12, toward the output position. For each position that first reverse domain advances, nucleation driver 15 nucleates a stable second reverse domain in wire 11. This action is under the control of the propagation pulses in conductors P1 and P2 via control conductors **P1*a* and P2*a*. When that first reverse domain is advanced to that portion of wire 12 coupled by conductor 14, it induces a pulse in that conductor for deactivating nucleation driver 15. Consequently, a number of stable second reverse domains are nucleated in the portion of wire 11 coupled by conductor 13 and that number corresponds to the number of positions the first reverse domain advances from its initial position in the input portion of wire 12 to that coupled by conductor 14. Since propagation driver 31 is moving all stored second reverse domain in wire 11 as well as the first domain in wire 12, the second domains form a sequence corresponding to the required number of dial pulses. That sequence is followed by the first reverse domain in wire 12 which, as will be seen hereinafter, functions to provide interdigit spacing. The disposition of the second reverse domains at the output positions in wires 11 and 12** is under the control of the output circuitry.

*Output circuitry*

Conductors 40$a$ and 40$b$ are coupled to remote positions of wires 11 and 12, respectively. Conductor 40$a$ is connected between a utilization circuit 41, which may be a register in a telephone central office, and ground. Conductor 40$b$ is connected between an interdigit spacing circuit 42 and ground. Both conductors 40$a$ and 40$b$ are connected to inputs of an OR circuit 43. A conductor 44 couples, electrically in series, both wires 11 and 12 at positions close to those coupled by conductors 40$a$ and 40$b$ but nearer to the reference position R. Conductor 44 is connected to an input of an AND circuit 46 the output of which is connected to an input of an OR circuit 48. The output of OR circuit 48 is connected to backspace driver 16 and, via a conductor C, to propagation driver 31. Conductor 44 also is connected to the input of an AND circuit 51 the output of which is connected to an input of OR circuit 48. Flip-flop 34 also is connected to an input of AND circuit 51 via a conductor 52. The output of OR circuit 43 is connected to an input of an OR circuit 55 the output of which is connected to flip-flop 34 via conductors 53 and 50$a$. The output of AND circuit 46 also is connected to an input of OR circuit 55 via a conductor 56. The output of OR circuit 55 also is connected to the input of OR circuit 48 via conductors 53 and 50$b$.

The output circuitry functions normally to control the return of reverse domains to an input position without providing an output pulse in conductor 40$a$ for detection by utilization circuit 41 unless that utilization circuit is capable of receiving an output pulse as described hereinafter.

As has already been explained, strobe pulses are applied at a high frequency. Inputs are permitted each time a strobe pulse is applied. Whether or not an input occurs when so permitted is determined by the subscriber. A similar operation is provided by the output circuitry. Specifically, divider 36 functions to reset flip-flop 34 at a frequency $f/x$ where $x$ is some whole number related to the rate at which utilization circuit 41 is capable of receiving dial pulses. To this end, divider 36 is a frequency divider providing pulses at a frequency of $f/x$ in response to strobe pulses at a frequency $f$. Such devices are well known in the art. The operation of the output circuitry may be considered as divided into two modes. The first mode is when flip-flop 34 is in a set condition. The second mode is when flip-flop 34 is in a reset condition permitting output pulses in conductor 40$a$.

When flip-flop 34 is in a set condition, a voltage level is maintained on conductor 52. If a first or a second reverse domain in wires 12 or 11, respectively, couples conductor 44 while flip-flop 34 is in the set condition, the pulse induced by that domain in conductor 44 enables AND circuit 51 and thus permits the voltage level on conductor 52 to activate backspace driver 16, via OR circuit 48. That voltage level deactivates propagation driver 31, via conductor C connected to the output of OR circuit 48, also. Consequently, all stored reverse domains are backspaced toward the input position. If backspace driver 16 and propagation driver 31 comprise a single driver, that voltage level on conductor 52 acts to reverse the pulse polarities thereof as described hereinbefore.

When flip-flop 34 is in a reset condition, no voltage level is maintained on conductor 52 and backspace driver 16 is not activated as just described. Rather, stored domains (first and second) pass those portions of wires 11 and 12 coupled by conductor 44. There are two possibilities; either a second reverse domain passes that portion of wire 11 coupled by output conductor 40$a$, or, alternatively, a first reverse domain passes that portion of wire 12 coupled by conductor 40$b$. We will consider the former first. Specifically, a second reverse domain passing that portion of wire 11 coupled by conductor 40$a$ induces a pulse therein. That pulse is detected as a first dial pulse by utilization circuit 41. That pulse also sets flip-flop 34 via OR circuits 43 and 55 and via conductors 53 and 50$a$. In addition, that pulse activates backspace driver 16, via OR circuits 43 and 55, conductors 53 and 50$b$, and OR circuit 48, and at the same time deactivates propagation driver 31 via the last-described route and via conductor C. Thus, a single dial pulse is provided and all stored reverse domains are returned to the input position. Each domain so detected is collapsed conveniently by a bias field, not shown.

The second possibility when flip-flop 34 is reset is that a first reverse domain in wire 12 passes that portion thereof coupled by conductor 40$b$. The domain induces a pulse in that conductor for setting flip-flop 34, via OR circuits 43 and 55 and via conductors 53 and 50$a$. That pulse also activates interdigit spacing circuit 42. Interdigit spacing circuit 42 functions, in response, to enable AND circuit 46 for a time suitable for spacing a set of dial pulses corresponding to a decimal digit from a next succeeding dial pulse. Circuit 42 functions to this end by providing a pulse of preselected duration. It is helpful to recall that a set of second reverse domains stored in wire 11 is followed by a first reverse domain in wire 12 so that an interdigit spacing is required each time a first reverse domain so induces a pulse in conductor 40$b$. When AND circuit 46 is so enabled, any reverse domain coupling conductor 44 activates backspace driver 16, via AND circuit 46 and OR circuit 48, whether flip-flop 34 is set or not, for returning all stored reverse domains to the input position. Importantly, flip-flop 34 is reset many times during the interdigit timing interval. Normally, second reverse domains would be producing output pulses under such conditions as already described. Such domains, however, are merely returned to the input position during the interdigit timing interval. The earliest stored domain induces a pulse in conductor 44 at each advance for causing return thereof to the input position, as described, and for setting flip-flop 34, via AND circuit 46, conductor 56, OR circuit 55, and conductors 53 and 50$a$. A first reverse domain coupling conductor 40$b$ is collapsed as is a second reverse domain coupling conductor 40$a$ as described hereinbefore.

To recapitulate then, strobe clock 30 thus permits inputs at a frequency $f$. Between succeeding strobe pulses, stored domains advance to an output position and return to an input position. Whether or not an input actually occurs when so permitted is under the control of a subscriber. When an input does occur, a controlled number of second reverse domains are stored as described. Whether or not an output pulse occurs depends on the frequency divider 36. That is, output pulses are permitted at a rate $f/x$ as described. When not so permitted, reverse domains are normally returned to the input position in the absence of an output. Strobe pulses are applied typically at a 0.5 kilocycle rate. Propagation pulses are applied at about a 400 kilocycle rate. A normal subscriber dial rate is at about ten cycles per second.

The various logic circuits, clocks, dividers, and other elements shown in FIG. 1 are any such elements capable of functioning in accordance with this invention.

The circuit of FIG. 1 is intended primarily for use in connection with subscriber subsets in a telephone system although the operation thereof is not limited to such a context. Accordingly, the utility of such a circuit is amply demonstrated by a description of the processing of a representative telephone number thereby. Such an operation is now described for a representative telephone number 722–2513.

Figure 2:
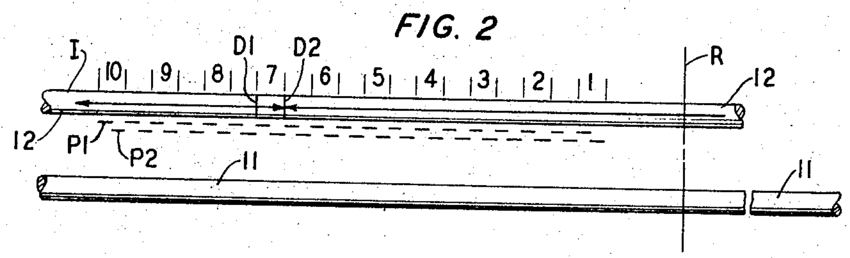
FIGS. 2 through 7 are schematic illustrations of a portion of the converter of FIG. 1 showing flux patterns therein.

FIG. 2 shows portions of wires 11 and 12 with the reference position indicated thereon by broken vertical line R as described in connection with FIG. 1. The input portion 1 of wire 12 has the numbers 1 through 10 noted thereabove indicating positions therein by the number of propagation pulses required to move a reverse domain at the corresponding position to the reference position. In practice, adjacent (bit) positions are spaced one position apart, and four propagation pulses are required to move a reverse domain from one position (bit location) to the next. The propagation conductors are indicated, in a now familiar manner, by horizontal lines P1 and P2 just beneath wire 12 in FIG. 2 and are understood to couple both wires 11 and 12. The magnetic wires are assumed initialized to a forward (magnetized) direction indicated by arrows directed to the left as viewed in FIG. 2. A reverse domain is indicated by an arrow directed to the right defining domain walls D1 and D2 with the forward domains.

In operation, stroke clock 30 provides pulses at a frequency *f*. In accordance with the assumed illustrative operation, translator 20 activates two translator outputs corresponding to conductor pair 19D and enables AND circuit 18, as described hereinbefore. Translator 20 is initiated in response to a depression of the pushbutton labelled 7 on a subscriber subset (not shown). Strobe clock 30 activates conductor 17, as described, concurrently with the activation of conductor pair 19D.

A pulse on conductor 17 nucleates a reverse domain at each of the positions coupled thereby along wire 12. Each of these reverse domains is, illustratively, of unstable length and thus collapses at the termination of the pulse in the absence of magnetic fields extending the reverse domain to a stable length. Those last-mentioned fields are provided, illustratively, in response to the pulses on conductor pair 19D, thus providing a stable reverse domain only at position 7 in wire 12. A pulse on a selected conductor pair (i.e., 19D) is limited illustratively in amplitude and/or duration to avoid possible interference with the propagation operation.

Stobe clock 30 also activates nucleation driver 15 and propagation driver 31, the latter after a brief delay sufficient to allow writing of a first reverse domain in wire 12. The propagation driver 31 in turn alternately pulses propagation conductors P1 and P2 for stepping the reverse domain shown in FIG. 2 toward the reference position. For each position (bit location) that reverse domain advances (for each four propagation pulses), nucleation driver 15 pulses conductor 13, nucleating a stable reverse domain in the coupled portion of wire 11. In the assumed illustrative embodiment, the reverse domain requires seven (sets of four) pulses to reach the reference position during which time seven reverse domains are nucleated in the portion of wire 11 coupled by nucleation driver 15. As the reverse domain in the wire 12, herein termed the first reverse domain, is advanced, so are the reverse domains in wire 11, herein termed second domains, advanced. Thus, a sequence of second domains are nucleated, and advanced as they are nucleated, to provide a number thereof equal to the number (actually one-fourth the number) of pulses required to advance the first reverse domain from its initial position to the reference position (actually to where conductor 14 is coupled).

Figure 3:
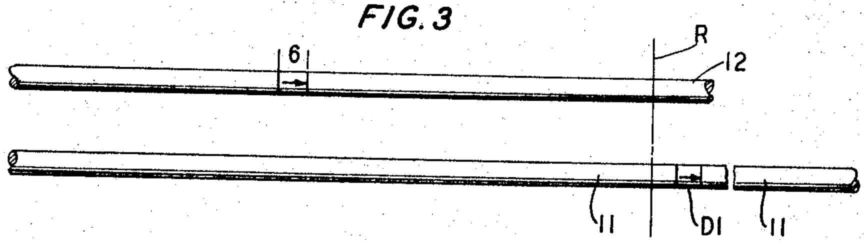
Figure 4:
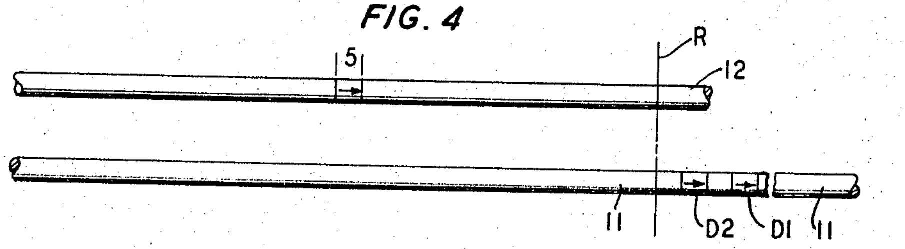
Figure 5:
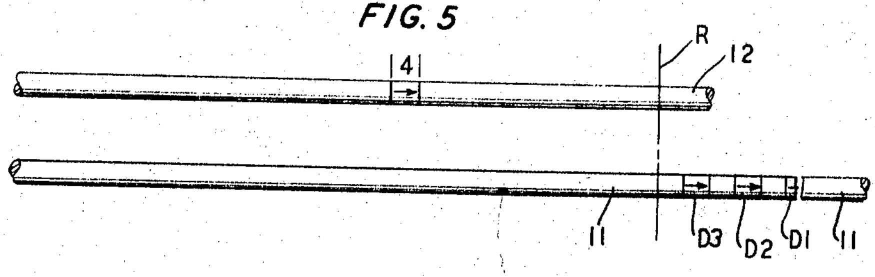
Figure 6:
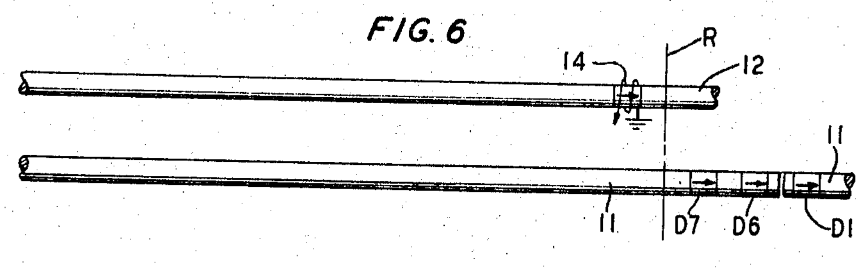

The advance of the first reverse domain and the simultaneous generation of second reverse domains is depicted in FIGS. 3 through 6. In FIG. 3 the reverse domain is shown advanced to the six position and one second reverse domain D1 is shown nucleated adjacent the reference position in wire 11. In FIG. 4, the first reverse domain is shown advanced to the five position, the second reverse domain D1 is advanced one position and another second domain D2 is generated adjacent the reference position in wire 11. FIG. 5 shows the first reverse domain advanced to the four position; three second reverse domains D1, D2 and D3 are now present in the output portion O of wire 11. FIG. 6 shows the first reverse domain adjacent the reference position in wire 12 and seven second reverse domains D1 . . . D7 present in the output portion of wire 11. One digit of the called number is now stored in the converter.

At this juncture in the operation the first reverse domain passes through the portion of wire 12 coupled by conductor 14 inducing a pulse therein. That pulse deactivates the nucleation driver 15 inhibiting the nucleation of additional second reverse domains. The couplings of conductors 13 and 14 to wires 11 and 12, respectively, are positioned one bit location apart (measured along a wire) to permit such operation.

Propagation driver 31 continues to apply propagation pulses to conductors P1 and P2 advancing the first reverse domain and the sequence of second reverse domains toward that remote position in wires 11 and 12 to which conductor 44 is coupled. A first or second reverse domain passing that position of either wire 11 or 12 coupled by conductor 44 induces a pulse therein enabling AND circuit 46 and AND circuit 51. Strobe clock 30, via divider 36, drives flip-flop 34 to a reset condition at a frequency $f/x$. When flip-flop 34 is (otherwise) in a set condition a voltage level is maintained thereby on conductor 52. When AND circuit 51 is enabled by a pulse in conductor 44 and flip-flop 34 is in a set condition, the voltage level in conductor 52 activates OR circuit 48, via AND circuit 51, activating (setting) backspace driver 16 and deactivating propagation driver 31. As a result, the first and second reverse domains are backspaced through wires 12 and 11 towards the reference position without inducing a pulse in conductors 40*a* or 40*b*.

When a first reverse domain returns to the position in wire 12 to which conductor 14 is coupled, it induces a pulse therein for deactivating backspace driver 16. In this manner, a first and a sequence of second reverse domains are stored in the output portions of wires 12 and 11 and circulated back and forth between succeeding strobe clock pulses. Importantly, additional information may be stored as described when the already stored information is again advanced towards the output position from which position that information is returned without producing an output unless such is called for.

Figure 7:
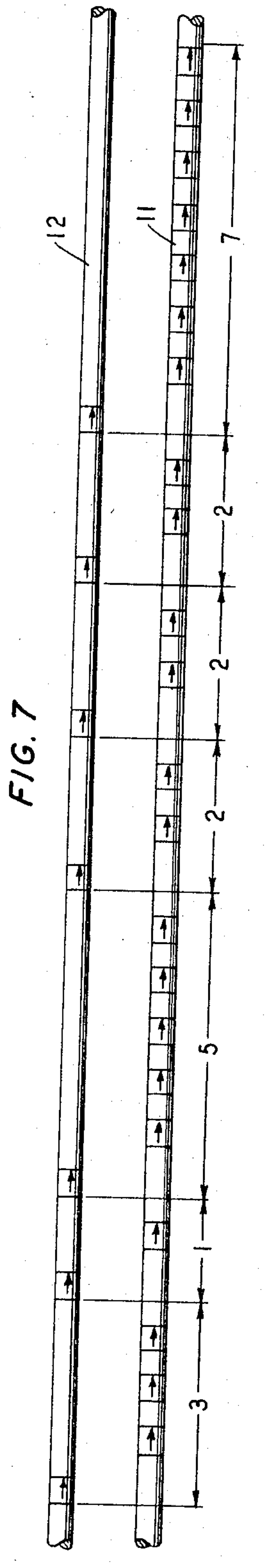

The storage of the illustrative telephone number, in response to the sequential activation of coded conductor pairs 19D, 19I, 19I, 19I, 19F, 19J, 19H, is shown in FIG. 7. The number is represented as, from right to left as viewed, a sequence of seven second reverse domains in wire 11 followed by a single first domain wire 12; two second domains in wire 11 followed by a single first domain in wire 12; two second domains followed by one first domain; two second domains followed by a first; five second domains followed by a first; one second domain followed by a first; and finally three second domains followed by a first. Recirculation of information is much faster than either input (write) or output (read-out) rates, the output portions of wires 11 and 12 being sufficiently long to store all the representation of all digits necessary for any call.

Information is thus written into an input portion of a wire at the leisure of the subscriber to be stored in an output portion of first and second wires as the representation of that information is advanced toward an output position.

Information is read out of the converter by periodically resetting flip-flop 34 as described. The voltage level applied to conductor 52 when the flip-flop is in the set condition is not applied for the period during which the flip-flop is reset. Thus, first and second reverse domains continue to advance, when the flip-flop 34 is in the reset condition, past the position of either wire 11 or 12 coupled by conductor 44. If a second reverse domain (in wire 11) is the first to reach the position to which conductor 40*a* is coupled, it induces a pulse therein and is itself destroyed (conveniently by an erase bias field not shown). That pulse is detected by utilization circuit 41 as a first dial pulse. In addition, that pulse sets flip-flop 34 and activates backspace driver 16. The voltage level in conductor 52 is re-established when flip-flop 34 is set as described hereinbefore.

Figure 8:
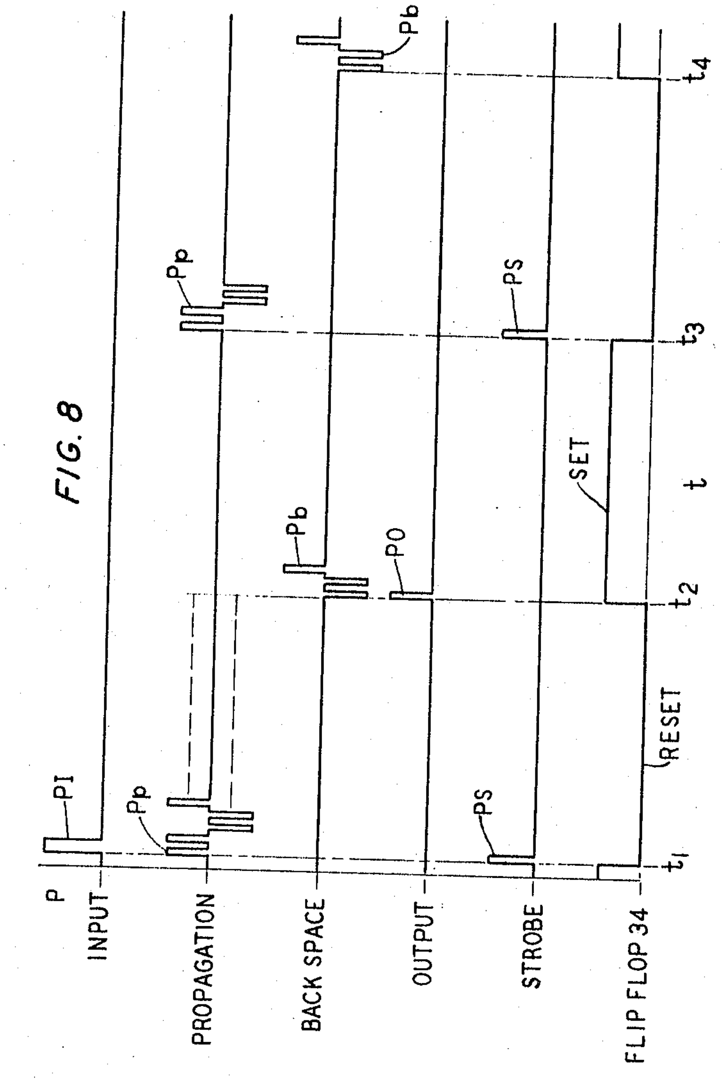
FIG. 8 is a pulse diagram of the operation of the circuit of FIG. 1.

The pulse timing is summarized in connection with the pulse diagram of FIG. 8. Specifically, an input pulse P1 arrives, from translator 20 at a time designated $t1$ in the figure. The strobe pulses PS and the propagation pulses PP are shown initiated at that time. A reverse domain nucleated in wire 12, in response to the strobe pulse and the input pulse, advances in response to the propagation pulses controlling the number of second reverse domains nucleated in wire 11. Both first and second reverse domains continue to advance in response to the propagation pulses. If flip-flop 34 is reset, an output pulse $Po$ is provided, backspace driver 16 is activated, and flip-flop 34 is set, when a second reverse domain is advanced to a position for coupling conductor 40*a*. At that time, designated $t2$ in FIG. 8, the propagation sequence is reversed (in polarity for example), backspace pulses $Pb$ being applied. The reverse domains are returned to the reference position at a time designated $t3$ in FIG. 8. Also at time $t3$, another strobe pulse is applied, permitting additional input resetting flip-flop 34 and activating propagation driver 31. In the absence of an input, no new reverse domains are nucleated. Already stored reverse domains, however, are advanced as before. If flip-flop 34 is set at a time, designated $t4$, when a second reverse domain reaches conductor 44, backspace pulses $Pb$ are applied and the reverse domains are recirculated without providing an output pulse and without being erased. Inputs are permitted at a rate $f$ determined by the strobe pulse and outputs are permitted at a rate $f/x$ permitted by the resetting of flip-flop 34.

After a set of second reverse domains (corresponding to a decimal digit) are read out in the manner described, a first domain appears in the position along wire 12 coupled by conductor 40*b* functioning in the manner described to provide a pulse for enabling AND circuit 46 for a time suitable for separating adjacent sets of dial pulses.

The number of pulses provided in utilization circuit 41 is seven, two, two, two, five, one, and three, each set being spaced apart by the pause due to the inter-digit spacing. This pulse sequence may be seen to correspond to the sequence shown in FIG. 7 for the assumed illustrative telephone number.

When all the reverse domains have been read out of the converter, the backspace driver remains activated. The next additional input and/or stroke pulse initiates the next operation exactly as described. If backspace driver 16 and propagation driver 31 comprise a single driver, such operation is in response to a strobe pulse as described. If, on the other hand, the drivers are separate, an additional connection (not shown) is provided between backspace driver 16 and strobe clock 30 for deactivating the former in response to a pulse from the latter.

What has been described is considered to be only illustrative of the principles of this invention. Accordingly, various modifications may be made therein by one skilled in the art without departing from the scope and spirit of the invention.

I claim:

1. A magnetic device comprising a first magnetic medium including first and second spaced apart positions, and means for writing stable magnetized conditions in said first position and for reading said conditions out at said second position at rates independent of one another, said means comprising first control means responsive to the arrival of a stored stable condition at said first position for propagating stable conditions toward said second position, second control means responsive to the arrival of a stored stable condition at said second position for propagating stable condnitions toward said first position, input means enabled by the arrival of a stable condition at said first position and responsive to a coded input signal for selectively storing stable conditions at said first position as said first control means steps stored stable conditions toward said second position, means for selectively detecting the arrival of a stable condition at said second position, and means for collapsing each condition so detected.

2. A magnetic device in accordance wth claim 1 wherein said first magnetic medium comprises a first domain wall magnetic wire and said stable conditions are reverse domains.

3. A magnetic device in accordance with claim 2 wherein said input means comprises a second domain wall magnetic wire including first and second spaced apart positions, and means for nucleating a first reverse domain at a position in said second wire a first distance from said first position different for each of a number of coded signals.

4. A magnetic device in accordance with claim 3 wherein said input means also includes means for nucleating a number of second reverse domains at said first position in first wire indicative of said first distance as said first reverse domain is stepped toward said first position in said second wire, said propagation means also being operative for stepping said first domain to said first position in said second wire, and means responsive to the arrival of said first reverse domain to said first position in said second wire for terminating nucleation of second reverse domains in said first wire.

5. A magnetic device in accordance with claim 4 wherein said propagation means is operative for repeatedly stepping said first domain between said first and said second positions in said second wire, said propagation means including means for terminating the stepping of reverse domains from said second to said first position in response to the arrival of a first reverse domain at said first position in said second wire.

6. A magnetic device in accordance with claim 5 including control means controlling said propagation means for stepping reverse domains to said first position in response to the arrival of a reverse domain at said second position in either said first or second wire.

7. A magnetic device in accordance with claim 6 comprising detection means including means for selectively inhibiting said control means.

8. In a code converter the combination comprising a first and a second domain wall magnetic wire, input means coupled to said first wire and responsive to each code of a coded input signal for selectively nucleating a single stable reverse domain in one of $n$ successive spaced-apart positions of said first wire, means coupled to said second wire for selectively nucleating from 1 to $n$ stable reverse domains corresponding to each said code of said coded input signal at spaced-apart positions of said second wire, said last-named means comprising propagating means coupled to said first and said second wires for successively moving stable reverse domains therein in a forward direction through said wires to an output position thereof and nucleating means coupled to said second wire and controlled by said propagating means for nucleating a stable reverse domain in said second wire for each of the successive ones of said $n$ positions of said first wire, said stable reverse domain being moved by said propagating means from the one of said $n$ positions at which it was nucleated to the $n$th position of said first wire.

9. The combination defined in claim 8 in combination with a source of strobe pulses of frequency $f$, and wherein said propagating means is responsive to each of said strobe pulses for moving stable reverse domains in the forward direction through said wires to said output position thereof, and means responsive to each of said strobe pulses for enabling said input means coupled to said first wire to receive the next successive code of said coded input signal.

10. The combination defined in claim 9 in combination with control means coupled to the $n+1$th position of said first wire and responsive to the movement of a reverse domain therethrough in the forward direction for disabling said nucleating means coupled to said second wire.

11. The combination defined in claim 10 in combination with output means coupled to said output position of said second wire and responsive to the arrival of a reverse domain thereat to provide an output signal pulse, a backspace driver coupled to said first and second wires for successively moving reverse domains therein in a reverse direction through said wires, means controlled by each said output signal pulse for actuating said backspace driver and control means coupled to the $n+1$th position of said first wire and responsive to the arrival of a reverse domain thereat for disabling said backspace driver to halt further movement of reverse domains in said first and second wires in the reverse direction.

12. The combination defined in claim 11 in combination with control means coupled to a control position of said first and said second wires, said control position being such that reverse domains in said wires when moved in a forward direction by said propagating means pass through said control position to reach said output position, means in said control means responsive to the arrival of a reverse domain thereat in said first or said second wires for activating said backspace driver whereby said reverse domain is prevented from reaching said output position.

13. A combination defined in claim 12 in combination with a source of control pulses of frequency $f_1$ where $f_1<f$, means responsive to each of said control pulses for disabling said control means whereby said reverse domains in said first or said second wires are moved in the forward direction through said control position to said output position by said propagating means.

14. The combination defined in claim 13 in combination with means coupled to the output position of said first wire and responsive to the arrival of a reverse domain thereat for activating said backspace driver and for enabling said control means to prevent the movement of a reverse domain in said second wire through said control position to said output position for a predetermined time.

References Cited

UNITED STATES PATENTS 3,369,225 2/1968 Fuller ---------------- 340—174

BERNARD KONICK, *Primary Examiner.*

BARRY L. HALEY, *Assistant Examiner.*